G. R. CLARK.
DUMPING WAGON BOX.
No. 69,075. Patented Sept. 24, 1867.
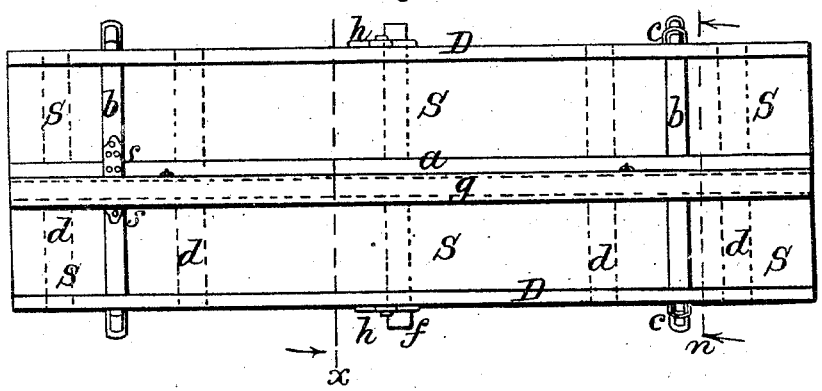
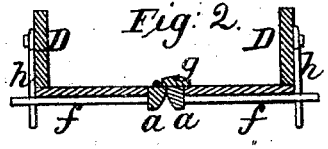 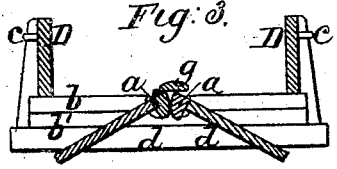
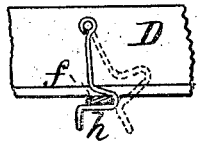
Witnesses
Inventor;

United States Patent Office.

GEORGE R. CLARK, OF LIVONIA, NEW YORK.

Letters Patent No. 69,075, dated September 24, 1867.

---

IMPROVEMENT IN DUMPING-WAGON BOX.

---

The Schedule referred to in these Letters Patent and making part of the same.

---

TO ALL WHOM IT MAY CONCERN:

Be it known that I, GEORGE R. CLARK, of Livonia, in the county of Livingston, and State of New York, have invented certain new and useful "Improvements in Dumping-Wagon Boxes;" and I do hereby declare that the following is a full, clear, and exact description thereof, reference being had to the accompanying drawings, making part of this specification, in which—

Figure 1 is a plan or top view of my invention.

Figure 2 is a transverse vertical section of the same, taken in the plane of the red line $x$ in fig. 1.

Figure 3 is a similar section of the same, taken in the plane of the red line $n$ in fig. 1

Figure 4 is an elevation of a section of one side, showing the locking-hook $h$.

Like letters indicate corresponding parts in the several figures.

This invention consists mainly in making the bottom of dumping-wagon boxes in two general sections longitudinally, they being divided laterally so as to fit down flush between the bolsters.

To enable others to make and use my invention, I will describe its construction and operation.

The false or secondary bolsters $b$ may be composed of two parts or bars, $b$ and $b'$, as shown in fig. 3, and bolted together. There are two circular cuts made in these bars or bolsters to receive the long axial bars $a$. There are several cross-bars, shown by the dotted lines $d$, figs. 1 and 3, framed into the long bars $a$. The boards forming the sections S of the bottom are nailed to these cross-bars. The bars $a$ are chamfered or rounded on their lower contiguous corners, as seen in figs. 2 and 3, to permit them to fold down, as when dumping. There may be strap-hinges, as shown at $s$, fig. 1, if desired, to attach the bottoms permanently to the false bolsters. The centre bars $f$ are made to extend beyond the side of the box to receive the locking-hooks $h$, as shown in figs. 1, 2, and 4. The side boards D may be made of any desired width, and may be provided with staples $c$ to encircle the stakes, as shown in figs. 1 and 3. There may be a sort of guard, $g$, hinged to the bottom to cover the joint between the bars $a$ and prevent the lodgment of any substance in the joint when the box is being dumped, as shown in fig. 3, which is done by simply throwing the latch or hook $h$ to the position of the dotted lines $h'$, fig. 4.

It may be necessary in unloading certain kinds of material, such as coarse manure, &c., to raise, and perhaps even remove the side boards.

What I claim as my invention, and desire to secure by Letters Patent, is—

The construction and relative arrangement of the several parts $a$, $d$, S, $f$, $h$, and D, constituting a dumping-wagon box, substantially in the manner and for the purposes herein shown and described.

GEO. R. CLARK.

Witnesses:
 DAVID GRAY,
 M. F. GIBBS.